United States Patent
Chu et al.

(10) Patent No.: US 9,584,415 B2
(45) Date of Patent: Feb. 28, 2017

(54) DEVICES, SYSTEMS AND METHODS FOR SERVICE CHAINS

(71) Applicants: Xingjun Chu, Ottawa (CA); Tao Wan, Ottawa (CA); Guoli Yin, Ottawa (CA); Yapeng Wu, Nepean (CA); Peter Ashwood-Smith, Gatineau (CA); Yinfeng Henry Yu, Ottawa (CA); Khaldoon Al-Zoubi, Kanata (CA)

(72) Inventors: Xingjun Chu, Ottawa (CA); Tao Wan, Ottawa (CA); Guoli Yin, Ottawa (CA); Yapeng Wu, Nepean (CA); Peter Ashwood-Smith, Gatineau (CA); Yinfeng Henry Yu, Ottawa (CA); Khaldoon Al-Zoubi, Kanata (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 106 days.

(21) Appl. No.: 14/610,252

(22) Filed: Jan. 30, 2015

(65) Prior Publication Data

US 2016/0226766 A1   Aug. 4, 2016

(51) Int. Cl.
*H04L 12/741* (2013.01)
*H04L 12/713* (2013.01)

(52) U.S. Cl.
CPC .......... *H04L 45/745* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 2006/0013209 A1 | 1/2006 | Somasundaram | |
| 2009/0092137 A1 | 4/2009 | Haigh et al. | |
| 2014/0351452 A1* | 11/2014 | Bosch | H04L 67/10 709/242 |
| 2015/0172170 A1* | 6/2015 | Bosch | H04L 45/20 709/238 |
| 2015/0358235 A1* | 12/2015 | Zhang | H04L 45/745 370/230 |
| 2015/0370586 A1* | 12/2015 | Cooper | G06F 9/45533 710/308 |

FOREIGN PATENT DOCUMENTS

| | | |
|---|---|---|
| CN | 102571602 A | 7/2012 |
| CN | 103139068 A | 6/2013 |

OTHER PUBLICATIONS

Enterprise Data Center Network Reference Architecture, Juniper Networks, Inc., www.juniper.net, May 2008.
International Searching Authority, International Search Report and Written Opinion for PCT/CN2016/072548 dated Apr. 25, 2016.

* cited by examiner

*Primary Examiner* — Diane Lo
(74) *Attorney, Agent, or Firm* — Norton Rose Fulbright Canada LLP; Maya Medeiros

(57) ABSTRACT

Routers using virtual routing and forwarding nodes to implement a service fabric of service chains. The router may configure M+1 virtual routing and forwarding instances, M being an integer representing a number of a plurality of service appliances in a data center network. Each virtual routing and forwarding instance may be associated with a routing table of routing rules to define various service chain routing paths. The routing rules are based on destination addresses in data packets.

26 Claims, 9 Drawing Sheets

DEVICES, SYSTEMS AND METHODS FOR SERVICE CHAINS

FIELD

Embodiments described herein relate to generally to the field of network communications, and in particular, embodiments described herein relate to devices, systems and methods for implementing service chains.

BACKGROUND

A data center network ("DCN") may implement a service chain to define network traffic regulation using service chain appliances as a series of check points and policy enforcement points. There exists a need for improved service chain implementations, or at least alternatives.

SUMMARY

In accordance with one aspect, there is provided a router with an ingress port for receiving network data packets from a plurality of source nodes of a plurality of networks, each network data packet having a destination address. The router has an egress port for transmitting the network data packets to at least one destination node. The router configures M+1 virtual routing and forwarding instances, (VRF instances or VRFIs), for routing at least one of the network data packets to at least one of M service appliances, M being an integer greater than one. The router has a persistent store for storing a plurality of routing tables, each routing table defining a plurality of routing rules for a VRFI of the M+1 VRFIs based on the destination addresses of the network data packets.

In accordance with some embodiments, the M+1 VRFIs have a VRFI for each service appliance of the M service appliances and an additional VRFI.

In accordance with some embodiments, the routing rules are not based on source addresses of the network data packets.

In accordance with some embodiments, the routing rules route a segment of the network data packets to bypass at least one service appliance of the M service appliances.

In accordance with some embodiments, the number of VRFIs of the M+1 VRFIs is not based on the number of networks of the plurality of networks.

In accordance with some embodiments, the network data packets received at the ingress port from the plurality of networks are routed by a common VRFI of the M+1 VRFIs.

In accordance with some embodiments, each VRFI is associated with a routing table of the plurality of routing tables.

In accordance with some embodiments, the number of VRFIs is based on the number of service appliances.

In accordance with some embodiments, the number of the plurality of networks is N, N being an integer greater than M+1.

In accordance with some embodiments, the M service appliances comprise at least one appliance selected from the group consisting of: firewall appliance, load balancing appliance, web service appliance, data service appliance, network address translator appliance, intrusion detection system appliance, and intrusion prevention system appliance.

In another aspect, there is provided a system with M service appliances, M being an integer greater than one. The system has a router with an ingress port for receiving network data packets from a plurality of source nodes of a plurality of networks, each network data packet having a destination address, and an egress port for transmitting the network data packets to at least one destination node. The router has a plurality of ports operable for connecting to the M service appliances. The router configures M+1 virtual routing and forwarding instances, VRFIs, for routing at least a portion of the network data packets to at least one of the M service appliances, a common VRFI of the M+1 VRFIs routing the network data packets received at the ingress port from the plurality of networks. The system has a persistent store for non-transitorily storing a plurality of routing tables, each routing table defining a plurality of routing rules for a VRFI of the M+1 VRFIs based on the destination addresses of the network data packets.

In accordance with some embodiments, the M+1 VRFIs comprise a VRFI for each of the M service appliances and an additional VRFI.

In accordance with some embodiments, the routing rules are not based on source addresses of the network data packets.

In accordance with some embodiments, the routing rules route a segment of the network data packets to bypass at least one service appliance of the M service appliances.

In accordance with some embodiments, the number of VRFIs of the M+1 VRFIs is not based on the number of networks of the plurality of networks.

In accordance with some embodiments, each VRFI is associated with a routing table of the plurality of routing tables.

In accordance with some embodiments, the number of VRFIs is based on the number of service appliances.

In accordance with some embodiments, the plurality of networks provide N different networks, N being an integer greater than M+1.

In accordance with some embodiments, the M service appliances comprise at least one appliance selected from the group consisting of: firewall appliance, load balancing appliance, web service appliance, data service appliance, network address translator appliance, intrusion detection system appliance, and intrusion prevention system appliance.

In another aspect, there is provided a method for providing a plurality of service chains. The method involves receiving network data packets from a plurality of networks at an ingress port of the router, each of the network data packets having a destination address. The method involves configuring a router with M+1 virtual routing and forwarding instances, VRFIs, for routing at least one network data packet to at least one of M service appliances, M being an integer greater than one. The method further involves storing a plurality of routing tables in a persistent data store, each routing table defining a plurality of routing rules for a VRFI of the M+1 VRFIs based on destination addresses of the network data packets. The method involves defining a plurality of service chains using the M+1 VRFIs. The method involves routing, using at least one of the M+1 VRFIs, the at least one network data packet based on the at least one destination address of the at least one network data packet using at least one routing rule. The method further involves transmitting the at least one routed network data packet to a destination node at the egress port of the router.

In accordance with some embodiments, the method may further involve routing a segment of data packets to bypass at least one service appliance.

In accordance with some embodiments, the method may further involve associating each VRFI with a routing table.

In accordance with some embodiments, the M+1 VRFIs has a VRFI for each service appliance of the M service appliances and an additional VRFI.

In a further aspect, there is provided a method for routing network data packets. The method involves receiving network data packets at an ingress port of a router, each of the network data packets having a destination address; The method involves routing, by at least one of M+1 virtual routing and forwarding instances, VRFIs, at least one network data packet to at least one of the M service appliances based on the at least one destination address of the at least one network data packet, M being an integer greater than one. The method involves transmitting the routed at least one network data packet to a destination node at the egress port of the router.

In accordance with some embodiments, the step of receiving involves receiving the at least one network data packet at the ingress port from at least one of N networks, N being an integer greater than M+1.

In accordance with some embodiments, the method may involve providing the at least one network data packet received at an ingress port to a common VRFI of the M+1 VRFIs.

Many further features and combinations thereof concerning the present improvements will appear to those skilled in the art following a reading of the instant disclosure.

DESCRIPTION OF THE FIGURES

Various aspects and embodiments are shown in the drawings, and described in connection therewith.

DETAILED DESCRIPTION

Figure 1:
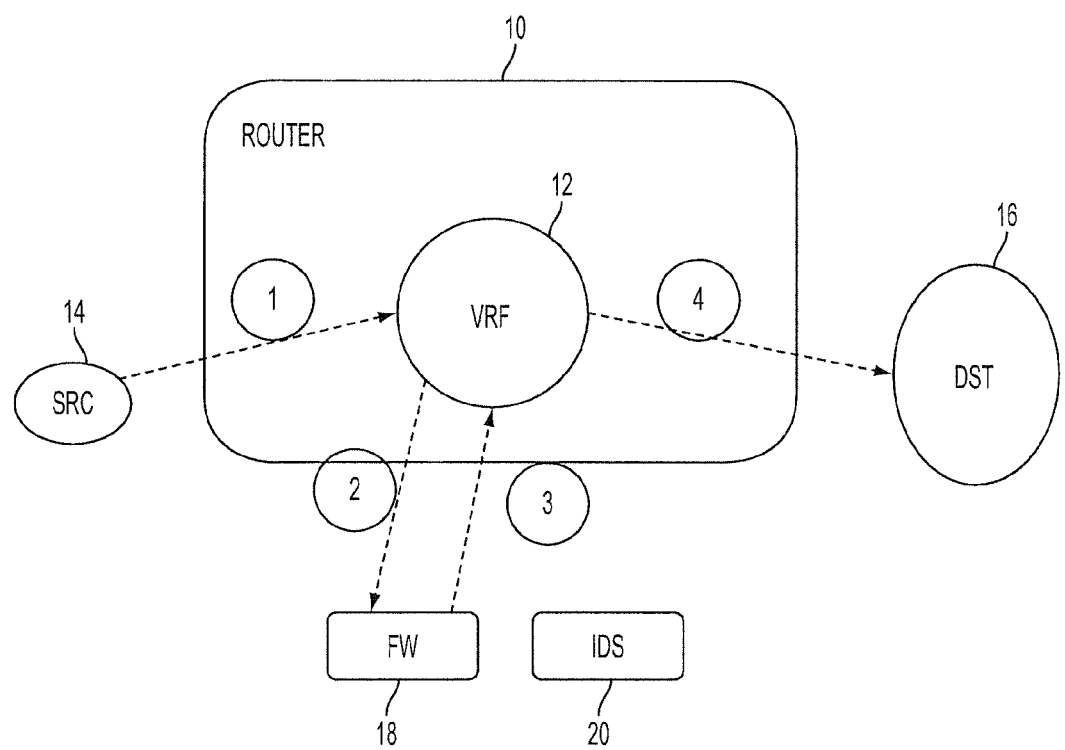
FIG. 1 is a schematic of a logical view of an example router.

Embodiments described herein relate to data center communication systems implementing service chains. A data center communication system may include data sources, data destinations, and one or more controllers, interconnected by a packet-switched network. The packet-switched network may include ingress nodes, intermediate nodes, and egress nodes. The nodes may include routers, switches, and service appliances or middle boxes that are connected to form service chains. Network virtualization may decouple the physical network and the logical network. A service chain and the functionality provided by its service appliances may be viewed as a logical abstraction of multiple physical connectivity nodes and links. Data packets flowing through the network may follow one or more routing paths. The sequence or series of routing paths may define a service chain of service appliances.

Embodiments described herein relate to devices, systems and methods for service chains implemented using VRF network routers with VRF instances. A physical network router may implement one or more virtual VRF instances, where each VRF instance is associated with a separate instance of a routing table for the network router. The routing table governs routing of data packet traffic flowing through the VRF instance. A VRF instance and its associated table may segment network data traffic flowing through the physical network router, without requiring multiple physical network routers. A VRF instance may also be referred to as a VRF network switch. A router configures a VRF instance as a virtual abstraction of different hardware components such as one or more switches, for example, and a portion of a persistent data store for storing the routing table associated with the VRF instance. A physical network router may implement multiple VRF instances up to a maximum capacity of the router. For example, the maximum capacity of a typical physical network router may be one hundred, or one thousand VRF instances. Some routers may support up to 2000 VRF instances.

A service chain may define network traffic regulation. A service chain may route network traffic through a series of service appliances, e.g. checking point appliances, policy enforcement appliances, and so on. A service chain may be represented as a logical flow of data packets on a network through the service appliances. A service chain links one or more service appliances or middle boxes by way of an underlying physical network of nodes, including switches, routers, bridges, and other hardware devices.

A service appliance is a computer networking device that routes, transforms, inspects, filters, or otherwise manipulates network data packets for different service purposes. Example service appliances include firewalls (FW), intrusion detection systems (IDS), intrusion prevention systems (IPS), load balancing (LB) devices, web services, application services, data base services and so on.

A service chain may be mapped to one or more routing paths on the physical network. A service chain may be an aggregation of physical links coupling the different hardware devices of the service chain. The routing paths may be implemented using VRF instances configured on one or more network routers.

Embodiments described herein relate to configuring a router with VRF instances, a VRF instance per service appliance in the service chain and a VRF instance for the egress port of the router. This interconnected system of hardware devices may generate a service network fabric. Embodiments described herein relate to systems and methods for implementing service chains using VRF functionality to leverage existing VRF capabilities of network nodes.

FIG. 1 illustrates a schematic of an example router 10. A router 10 may route network data traffic from a source node 14 to a destination node 16. A router 10 may provide the capability to route or steer network data traffic to a middle box or service appliance in a stateless fashion based on only on the destination address. Knowledge of the source address of the data packet is not required for a router configuration where the forwarding may be done based on destination address in the packet header.

The router 10 may implement a VRF instance 12 as a virtual abstraction of router hardware, where each VRF instance is associated with its own routing table instance. The example shown in FIG. 1 is a theoretical example of the functionality that may be required of a router to route data to different service chain appliances (e.g. FW appliance 18, IDS appliance 20). For example, it may be desirable for the router to route network data traffic to a FW appliance and then on to the destination node 16. In practice, the desired functionality shown in FIG. 1 may be beyond the capability of a single router 10 implementing a single VRF instance 12. For example, a router 10 may require a VRF instance 12 to serve as an egress to the destination node 16. This theoretical example network routing configuration may require knowledge of both the source and destination for a data packet. For example, a VRF instance 12 may route network data packets with destination address X to FW appliance 18 using routing rules based on destination address. If the FW appliance 18 routes those same network data packets with destination address X back to the VRF instance 12 then the VRF instance 12 may not be able to distinguish those network data packets with destination address X arriving from the FW appliance 18 and those network data packets with destination address X arriving from the source node 14. The network data packets arriving from the source node 14 still need to be routed to the FW appliance 18. The routing rule based on destination address X may continue routing all network data packets with destination address X back to FW appliance 18 even if they have already been processed thereby. This may create a circular routing path between the VRF instance 12 and the FW appliance 18. This may illustrate a practical limitation for service chain implementation using routing rules based on destination addresses.

Figure 2B:
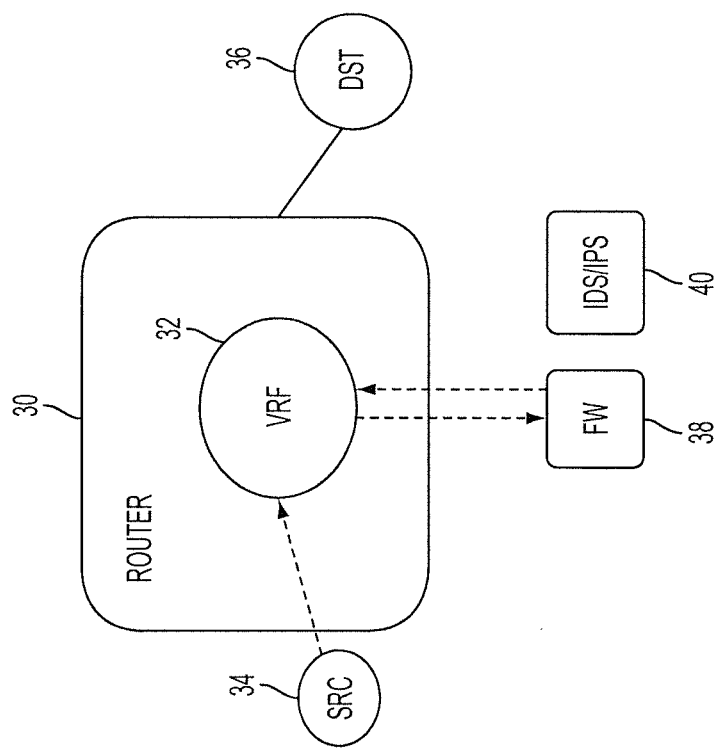
FIGS. 2A and 2B are schematics of logical views of another example router.
Figure 2A:
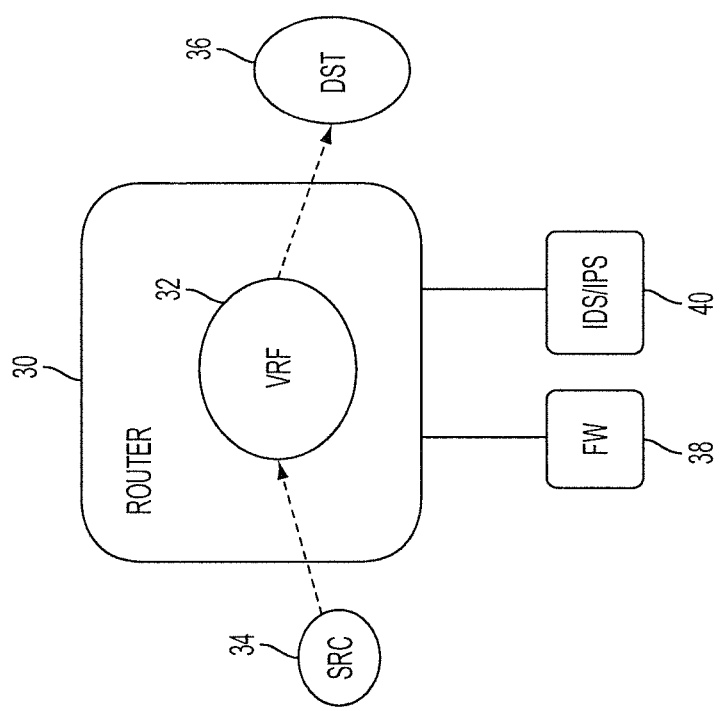

FIGS. 2A and 2B illustrate additional example schematics of a router 30. The router 30 is shown to implement a VRF instance 32. In practice, a VRF instance 32 may forward network data traffic received from the source node 34 based on the destination address in the data packet. Accordingly, the network data traffic may be routed to either destination node 36 or firewall 38 or other service chain appliance, e.g. IDS or intrusion prevention system ("IPS") 40. As shown in FIG. 2B, data traffic can flow bi-directionally between VRF instances and the service appliances.

For some service chain implementations, the routing may be based on the destination address of each packet. The routing based on destination address does not require knowledge or tracking of the source address, as the source address of the packet may be unknown and not part of the available routing data for the router. The destination address of a packet may not change if the packet goes through a service appliance, making it hard for a router to determine whether a packet has gone through a service appliance or not as the routing may be based destination address. A service chain may include routing paths involving two or more service appliances. The routing paths are defined by routing rules of routing tables associated with the VRF instances. To implement a service chain, it may be important to know whether a data packet needs to go through a first service appliance or if the data packet has already gone through the first service appliance and should proceed to the next service appliance in the chain. For some implementations, a data packet may be stamped by a service appliance as it passes through the service appliance. However, the service appliance may require software updates to implement stamping functionality and the other components may require updates to process the stamping and route packets based on the stamping.

Source routing may involve a forwarding routing path that may need to be explicitly defined in the header of a data packet. Source routing requires source data to be readily available routing data for the routing which may require specialized packets and a particularly configured network using hardware or software upgrades. For example, source routing may have to be enabled and supported by the network data path nodes. Segment routing is similar to source routing. An inline service chain may involve a two arm service chain between two VRF instances where all network traffic flows through both VRF instances and all service appliances in the service chain. In this case, the network data traffic is not segmented and the router cannot route a segment of the network data traffic to bypass a service appliance in the service chain if that segment of network data traffic does not need to be processed by the particular service appliance. This may not efficiently use network bandwidth. Policy routing may require special implementation of forwarding based on both destination and source with a particularly configured network.

In accordance with an aspect, embodiments described herein may provide a physical router configured with VRF instances. The number of configured VRF instances corresponds to the number of service appliances in a service chain or service fabric provided by multiple service chains, plus an additional VRF instance. That is, the number of VRF instances is one more than the number of service appliances, which provides sufficient connectivity to route a packet received at the ingress port of the router to all service appliances and the egress port of the router. For M service appliances, M being an integer, the number of configured VRF instances is M+1. The additional VRF instance may be for the ingress port or the egress port of the router in that it either receives packets from the ingress port or provides packets to the egress port. The router may configure each VRF instance with an associated routing table of routing rules based on the destination address in network data packets to implement the routing paths of the service chain(s).

Figure 3:
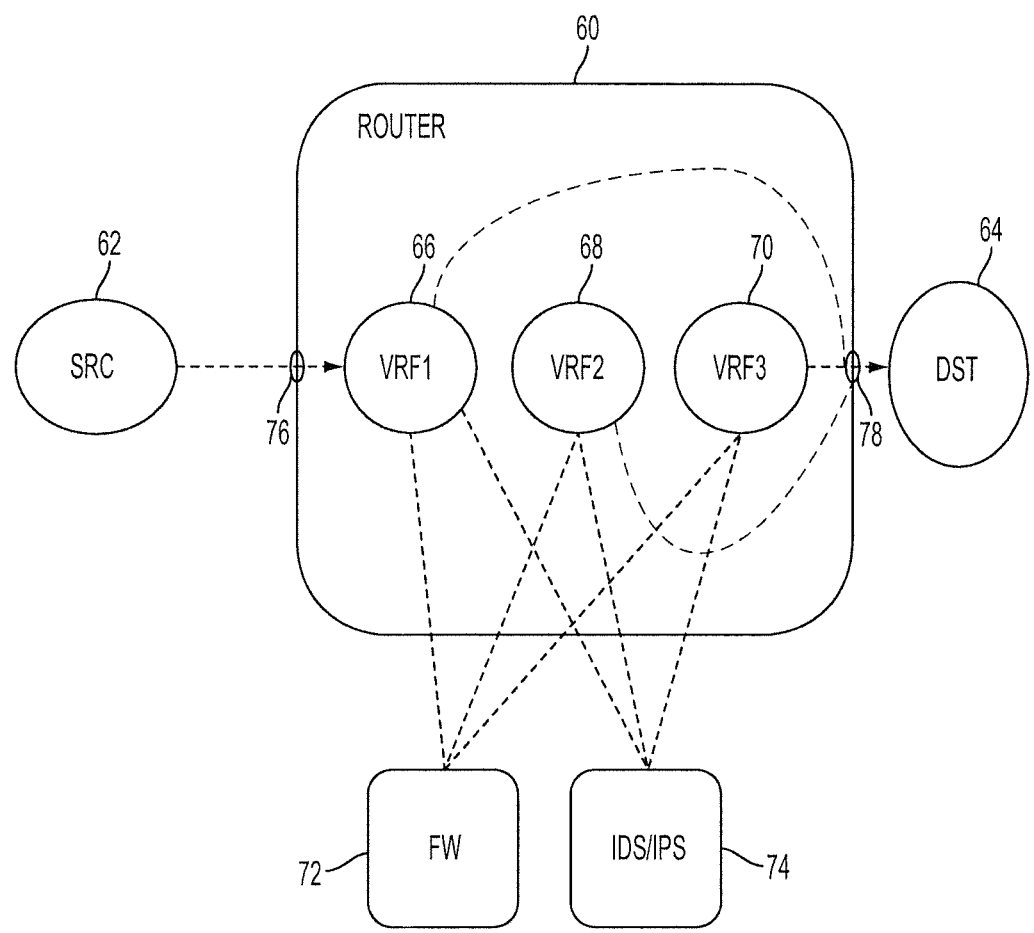
FIG. 3 is a schematic view of an example service chain implementation according to some embodiments.

FIG. 3 illustrates an example service chain network according to embodiments described herein. A router 60 may receive data from source node 62 for forwarding to a destination node 64 after traversal through one or more service appliances (e.g. FW appliance 72, IDS/IPS appliance 74). For this illustrative example, the router 60 may be configured to route data packets to two service appliances (e.g. FW appliance 72, IDS/IPS appliance 74). The router 60 may configure a number of VRF instances that corresponds to the number of service appliances used for the service chain or service fabric (e.g. FW appliance 72, IDS/IPS appliance 74). As noted, there is an additional VRF instance. The additional VRF instance may serve the ingress port 76 or the egress port 78. Accordingly, for this illustrative example, the router 60 may configure three VRF instances 66, 68, 70. Incoming data packets from source node 62 may arrive at the ingress port 76 of the router 60. VRF instance 66 may serve the ingress port 76 of the router 60 and receive packets from all networks connected to the router 60.

Data packets may be routed based on destination addresses therein using routing tables of routing rules for VRF instances 66, 68, 70 to service appliances (e.g. FW appliance 72, IDS/IPS appliance 74). Each service appliance may have a respective egress interface to each VRF instance 66, 68, 70. For example, VRF1 instance 66 may route a data packet to FW appliance 72 based on the destination address of the data packet. FW appliance 72 may transmit the data packet to VRF2 instance 68 via an egress interface. VRF2 instance 68 may in turn route the data packet to IDS/IPS appliance 74. IDS/IPS appliance 74 may transmit the data packet to VRF3 instance 70 via an egress interface, which in turn may forward the data packet via the egress port 78 to the destination node 64. Accordingly, the routing route for the data packet may be SRC-VRF1-FW-VRF2-IDS/IPS-VRF3-DST. VRF1 instance 66, VRF2 instance 68, VRF3 instance 70 may forward data packet traffic only based on the destination address of the data packets. The number of configured VRF instances may correspond to the number of service appliances to ensure a sufficient number of VRF instances for routing a data packet to each service appliance in the service chain if needed, while still providing flexibility for routing a data packet to bypass one or more service appliances in the service chain. For example, if router 60 only configured one or two VRF instances, there would not be a sufficient number of VRF instances for routing a data packet to both FW 72 appliance and IDS/IPS 74 appliance based on the destination address of the data packet, while still providing flexibility for routing another data packet to bypass either FW 72 appliance or IDS/IPS 74 appliance.

As noted, the router 60 may not consider a source of a data packet for routing and may only route based on destination address of the data packet. In this case, for example, the VRF3 instance 70 for the egress port may not distinguish between a data packet traffic received from FW 72 and a data packet received from IDS/IPS 74 as coming from different sources.

As noted, the router 60 provides flexibility for routing data packets to bypass one or more service appliances in the service chain.

The router 60 can segment network data traffic using the VRF instances 66, 68, 70 and their corresponding routing tables of routing rules based on destination address so that a segment of the network data traffic can bypass FW appliance 72 or IDS/IPS appliance 74. The VRF instances 66, 68, 70 may route data packets using corresponding routing tables to bypass one or more service appliances in the service chain depending on the destination addresses of the data packets and the routing rules of the routing tables. For example, VRF1 instance 66 may route a data packet arriving at the ingress port 76 to FW appliance 72 using its routing table based on the destination address of the data packet. FW appliance 72 may provide the data packet to VRF2 instance 68 using its egress interface, and VRF2 instance 68 forwards the data packet to the egress port 78 and on to destination node 64 via a link between VRF2 instance 68 and egress port 78. Accordingly, the routing of the data packet may bypass IDS/IPS appliance 74 based on the routing route VRF1-FW-VRF2-DST. As another example, VRF1 instance 66 may route a data packet arriving at the ingress port 76 to IDS/IPS appliance 74 using its routing table based on the destination address of the data packet. IDS/IPS appliance 74 may provide the data packet to VRF3 instance 70 using its egress interface, and VRF3 instance 70 may forward the data packet to egress port 78. Accordingly, the routing of the data packet may bypass FW appliance 72 based on the routing route VRF1-IDS/IPS-VRF3-DST.

As a special case, a data packet received from source node 62 may bypass both service appliances. For example, VRF1 instance 66 may route the packet directly to the destination node 64, or route SRC-VRF1-DST. This may be done by direct routing from VRF1 instance 66 to destination node 64 via a link from VRF1 instance 66 to the egress port 78 of the router 60 which leads to the destination node 64. This is a special case and generally data packets will be routed to VRF3 instance 70 for the egress port 78. Each VRF instance 66, 68, 70 may be associated with its own routing table stored and maintained as a data structure in a persistent store. The routing tables for the VRF instances 66, 68, 70 may be different. Embodiments described herein may use a number of VRF instances 66, 68, 70, that corresponds to a number of service appliances used for the service chains. In some example embodiments, there may be an additional VRF instance for the ingress port 76 or the egress port 78. For example, there may be ten different networks connecting to router 60 for network data traffic, and there may be two different service appliances 72, 74 for implementing different service chains. A service chain may be a particular combination of service appliances that process network data packets in a particular order. For some embodiments described herein, there may be three VRF instances 66, 68, 70 that connect to a source node 62, service appliances, and destination node 64 to implement the service chains for this example. In accordance with embodiments described herein, the number of VRF instances is not determined based on the number of virtual networks providing input network data streams. If a router dedicates a VRF instance for each incoming network, then this may use significant router resources if there is a large number of incoming networks as compared to the number of service appliances. If a router configures a number of VRF instances corresponding to the number of service appliances then this may efficiently use resources if there is a relatively small number of service appliances (e.g. less than ten) as compared to the number of incoming networks.

Each service chain may be defined as routing paths realized using routing rules and routing tables of the VRF instances. For example, a routing rule of routing table for VRF instance VRF1 may direct all network packets with destination D1 to one appliance A1. Another routing rule of routing table for VRF instance VRF1 may direct all network packets with destination D2 to another appliance A2. A further routing rule of routing table for VRF instance VRF1 may direct all network packets with destination D3 to another appliance A3, and so on. These routing paths may be used to form different service chains.

Embodiments described herein may provide a router with additional VRF instances 66, 68, 70 including a number of VRF instances corresponding to the number of service appliances (FW appliance 72, IDS/IPS appliance 74). In some example embodiments there may be one VRF instance for the source node 62 or the destination node 64. This may require a resource consumption of a number of VRF instances 66, 68, 70 corresponding to a number of service appliances and the source node 62 or the destination node 64. The multiple VRF instances 66, 68, 70 form a service fabric where different service chains may be formed within the service fabric using the corresponding routing tables and routing rules. There may be a large number of incoming networks (e.g. hundreds or thousands) as compared to a small number of connected service appliances (e.g. less than ten). A routing configuration with a number of VRF instances corresponding to a number of service appliances requires fewer resources than a routing configuration where each network inputs into its own VRF instance.

Figure 7:
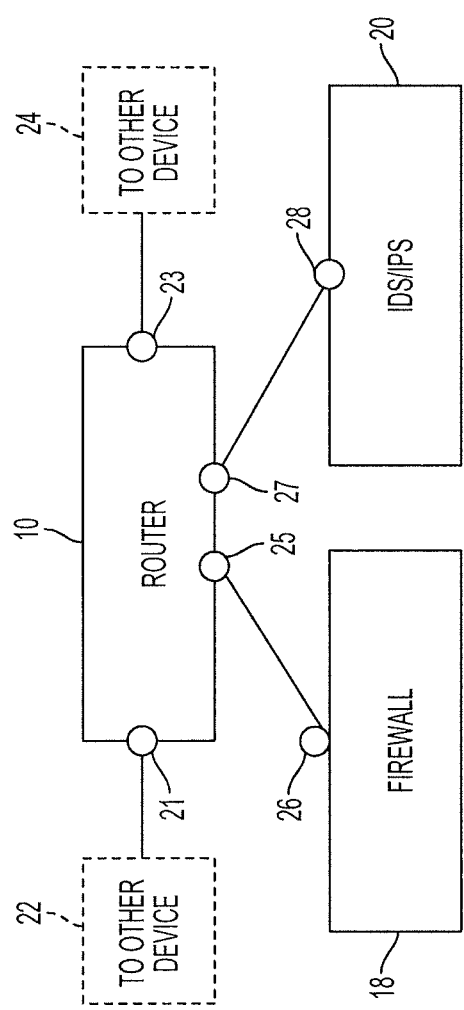
FIG. 7 illustrates an example physical view of a service fabric according to some embodiments.

FIG. 7 illustrates an example physical view of the service chain network or service fabric of FIG. 3 according to some embodiments. The router 10 may connect to devices 22, 24 via ports 21, 23. The router 10 may connect to service appliances 18, 20 via ports 25, 26, 27, 28, such as Ethernet ports for example.

The service fabric provided by the network configuration of embodiments described herein may efficiently utilize bandwidth for a DCN as all network data traffic flow is not required to pass through all service appliances. The routing configuration enables data segmentation by destination address to enable a portion or segment of network data traffic to bypass one or more service appliances connected on the DCN. For example, a service fabric may connect four service appliances. The routing configuration may route a large segment of the network data traffic to bypass two service appliances, which is a reduction of bandwidth usage as compared to an implementation that does not bypass the two service appliances.

Figure 4:
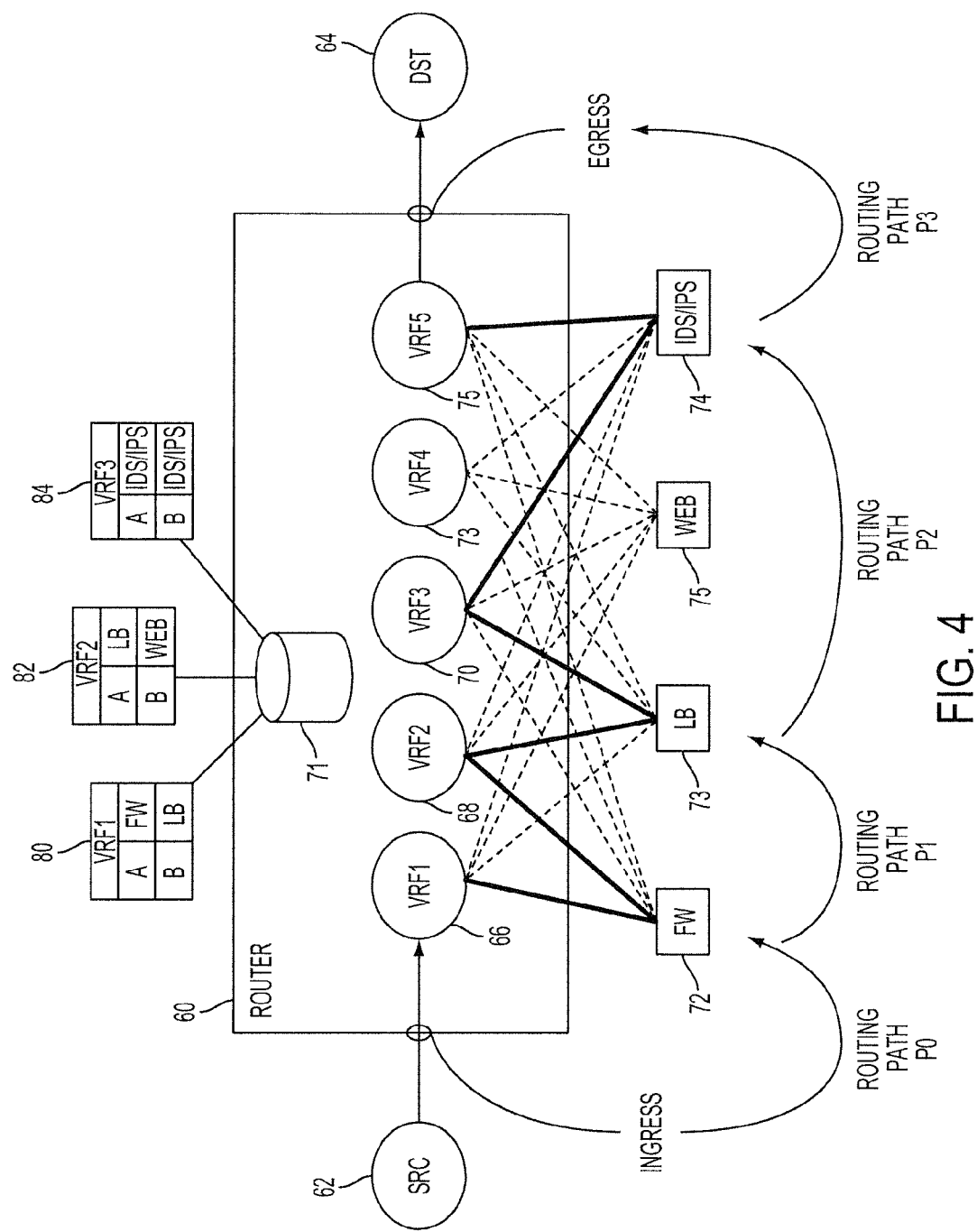
FIG. 4 illustrates another schematic of a router according to embodiments described herein.

FIG. 4 illustrates another schematic of a router 60 according to embodiments described herein. For this example, there may be hundreds of different networks connecting to router 60 for providing network data traffic, and there may be different service appliances 72, 73, 74, 75 for implementing a service fabric of different service chains. Different combinations of service appliances are provided by different service chain routing paths for the network data traffic. Embodiments described herein may configure a router 60 with five VRF instances 66, 68, 70, 73, 75 to implement the service chains for this example. The number of VRF instances corresponds to the number of service appliances and an additional VRF instance such that the number of VRF instances is one greater than the number of service appliances. In some embodiments, the router 60 may support limited VRF instances due to resource restriction on the router 60, for example, a router may support 1000 VRFs or 2000 VRFs. However, there may only be a limited number of service appliances for the service fabric, which is a number within the VRF capacity of a router in most cases. For example, there may be 2 to 5 service appliances for the service fabric, which is within the VRF capacity of a router.

A service chain may be defined using one or more routing paths to service appliances. A network data packet may be a formatted unit of data. Each network data packet may be associated with a destination address as a defined field value in the data packet. A routing table may be a collection of routing rules configuring a VRF instance to forward network packets based on destination addresses onto different service appliances, or destination node 64. The routing rules may be linked to destination addresses. Particular routing rules may be used to implement the one or more routing paths of a service chain. For example, as shown in FIG. 3, all network data packets with a destination address A may be associated with the routing path FW appliance 72 to IDS/IPS appliance 74 to destination node 64.

Referring back to FIG. 4, another example service chain may be provided by routing path P0 logically shown as source node 62 to FW appliance 72, routing path P1 logically shown as FW appliance 72 to LB appliance 73, routing path P2 logically shown as LB appliance 73 to IDS/IPS appliance 74, and routing path P3 logically shown as IDS/IPS appliance 74 to destination node 64 via the egress port. This may be implemented using a routing rule of routing table 80 for VRF1 instance 66 indicating that packets with destination address A be forwarded to FW appliance 72, a routing rule of routing table 82 for VRF2 instance 68 indicating that packets with destination address A be forwarded to LB appliance 73, a routing rule of routing table 84 for VRF3 instance 70 indicating that packets with destination address A be forwarded to IDS/IPS appliance 74. All packets at VRF5 instance may be forwarded to the destination node 64. The routing paths of the example service chain for packets with destination address A is shown in FIG. 4 by bold lines in the service fabric. The route shown for packets with destination address A is SRC-VRF1-FW-VRF2-LB-VRF3-IDS/IPS-VRF5-DST, but other routing paths are also possible. The packet may also pass through VRF4 instance 73 in some embodiments with a multiple path configuration.

There may be a routing table for each VRF instance. A VRF instance may have a link to the ingress port or a link to the egress port for different example embodiments.

Each destination address for data packets is linked to a specific service chain provided using the service fabric network. A DCN may not use overlapping destination addresses so that routing rules may not be ambiguous.

Embodiments described herein may configure a router to consume more VRF resources as multiple VRF instances are configured, a number of VRF instances corresponding to one greater than the number service appliances. The number of VRF instances may be limited to the number of service appliances plus an additional VRF instance. A DCN may only have a limited number service appliances for the service fabric, making the resource usage limited and simplifying routing. The number of service appliances may be small and limited services may be required for the service chain. As examples, there may be three service appliances required for a service chain provided by router, there may also be two, four, five, six, ten, and so on, different service appliances.

In another aspect, embodiments described herein configure a router with multiple VRF instances. Each VRF instance is associated with its own routing table. Each routing table defines routing rules based on the destination address of the network data packets. The routing rules define routing paths for service chains. The routing rules may be based on the destination address of the network data packets. A service fabric is an aggregate of the routing paths for the service chains. The different service chains may use different combinations of service appliances with packets routed based on particular destination addresses. The service fabric provides different options for routing paths or service chain combinations. Network traffic may be forwarded onto the service chain based on the forwarding routes or routing paths. The routing paths are defined by the routing rules of routing tables. Each VRF instance of the router may have access to a routing table on a persistent store defining routing rules based on destination addresses.

Embodiments described herein may leverage hardware and software VRF capabilities of routers to configure service chains and a service fabric. A VRF instance may be referred to as a VRF network switch, and embodiments described herein may provide a number of VRF network switches that corresponds to the number of service appliances, plus an additional VRF network switch. The multiple VRF network switches are associated with routing tables of routing rules that may work together to provide a service fabric. A variety of service chains may be formed using the meshed service fabric.

Embodiments described herein may reduce a forwarding decision based on both source and destination (e.g. FIG. 1) to a decision based on destination by using additional VRF instances for each service appliance of the service fabric. The VRF instances are used to the define service chains without changes to data path or control protocol. Embodiments described herein may support VRF capable network devices. For example, routers may have the capability to configure VRF instances. Embodiments described herein may leverage the VRF configuration capabilities of a physical router to implement routing paths for service chains.

Another example service chain implementation may involve configuring a VRF instance per incoming network such that each network provides input data packets into its own VRF instance. There may be a large number of incoming networks which would require a correspondingly large number of VRF instances. There may be hundreds of incoming networks delivering data packets, and less than ten service appliances, as an illustrative example. VRF instance allocation per network may cause VRF resources to be consumed quickly for the large number of networks. In contrast, determining the number of VRF instances based on the number of service appliances may efficiently use resources when there is a large number of incoming networks. All incoming networks deliver packets from source node through a common VRF instance at the ingress port of the router. That is, the network data packets received from all incoming networks may be input into a first VRF instance of the service fabric. In this configuration, data packets from different networks are input into a common VRF instance at the ingress port of the router.

A router may service a large number of networks relative to the number of service appliances used for the service fabric. The number of networks may typically be larger than the number of service appliances. A router configuration with a number of VRF instances that corresponds to the number of service appliances uses resources more efficiently than a configuration based on one VRF instance per network. Embodiments described herein may provide a VRF service chain implementation where routing of network data traffic may route segments of the network data traffic to bypass specific service appliances of the service fabric. The routing may be based on destination address of the network data traffic.

A service chain may be an important feature for DCN applications. Embodiments described herein may provide DCN elements such as switches and routers to implement a flexible service fabric that efficiently uses bandwidth of the DCN applications to construct different service chains for different network data traffic segments.

Figure 5:
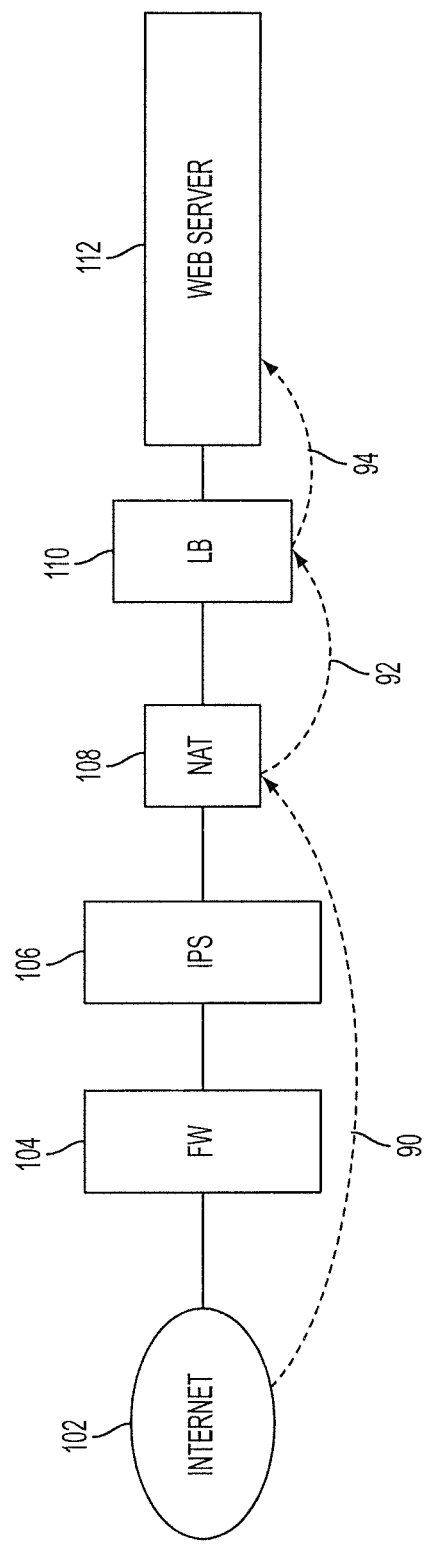
FIG. 5 illustrates a further example schematic of a service chain involving multiple routing paths to between service appliance.

FIG. 5 illustrates a further example schematic of a service chain involving multiple routing paths to various service appliances. For example, a service chain may include three routing paths: a routing path 90 for Internet node 102 to network address translator (NAT) appliance 108, a routing path 92 for NAT appliance 108 to LB appliance 110, and a routing path 94 for LB appliance 110 to a web service 112. Other example service appliances that may be used in other service chains include FW appliance 104 and IPS appliance 106.

A service fabric includes multiple service chains to provide an option for different combinations of service appliances. That is, a service fabric provides multiple routing paths that can be used to form different service chains involving different service appliances. A router according to some embodiments may connect to various service appliances and be configured to form a service fabric. The router may provide multiple service chain options involving different routing paths between the service appliances. For the example shown in FIG. 5, the router may configure five VRF instances, which number is equal to the number of service appliances (e.g. FW appliance 104, IPS appliance 106, NAT appliance 108, LB appliance 110) and one VRF instance for the egress port. According to some embodiments, the Internet 102 may be treated as a source node, and the web service 112 may be the destination node.

Figure 6:
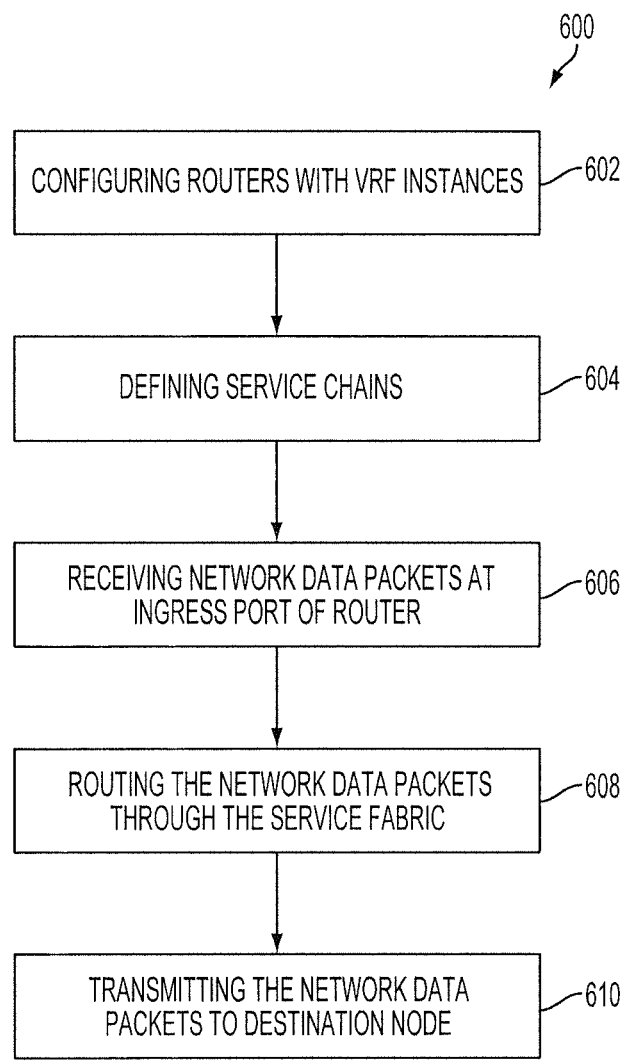
FIG. 6 illustrates a flow diagram of a method for providing a service fabric according to example embodiments.

FIG. 6 illustrates a flow diagram of a method 600 for providing a service fabric according to an example embodiment.

At step 602, a router is configured with VRF instances. Each VRF instance is associated with a routing table maintained by a persistent data store. The routing table may define routing rules based on destination addresses of the network data packets. The router also configures a number of VRF instances corresponding to one greater than the number of service appliances. Accordingly, the number of VRF instances may be equal to the number of service appliances connected to the router as part of the service chains, plus an additional VRF instance. The additional VRF instance may serve an ingress port or an egress port of the router to, respectively, receive network data packets from a source node or transmit the network data packets that have passed through a service chain to a destination node. The number of VRF instances may be based on the number of service appliances connecting to a router. The number of VRF instances may not be based on the number of networks connecting to a router. For example, if there are hundreds of incoming networks and four service appliances forming the service fabric, then the number of VRF instances would be based on the four service appliances. The router may configure a number of VRF instances equal to the number of service appliances and a VRF instance for the egress port.

At step 604, the router configured with VRF instances may connect to service appliances to define and complete service chains for network data traffic. The service chains provide a service fabric for network data traffic. A service fabric may be the aggregate of the permitted routing paths to and from the VRF instances and the connected service appliances. The service fabric may be implemented using Layer 3 (e.g. Internet Protocol) interface configuration as well as which VRF instance each interface belongs to, for example. The routing rules may define routing paths for a service chain. As noted, the routing rules may be based on the destination address of the network data packets. A service fabric may define multiple routing paths between various service appliances connected to the router to form different service chains. A service fabric may provide different service chains. Different routing paths may be defined by the routing rules of the VRF instances. Accordingly, a service fabric defines possible routing paths between VRF instances and the service appliances. The routing rules of the VRF instances define the routing paths of the different service chains. Example service fabrics are shown in FIGS. 3 and 4.

At step 606, network data packets from different networks are received at an ingress port of the router. Each network data packet may include a destination address used for routing the respective network data packet through the service fabric to different service appliances. The number of VRF instances may not be based on the number of networks in some embodiments such that the routing configuration does not require a separate VRF instance for each incoming network.

At step 608, using the VRF instances, the network data packets may be routed based on their destination addresses through a service chain defined by the service fabric. For example, a network data packet with destination A may be routed to a FW appliance and a network data packet with destination B may be routed to a LB appliance. Accordingly, not all network data packets may pass through the same service chain of service appliances. Some network data packets may bypass certain service appliances depending on the routing rules of the VRF instances and the destination addresses of the data packets. The network data packets may be segmented by the routing rules based on destination address, and segments of the data packets may be routed to bypass one or more service appliances, such that all network data packets are not required to route through all service appliances.

At step 610, after passing through a service chain of service appliances, the network data packets are transmitted to a destination node at the egress port of the router.

Figure 8:
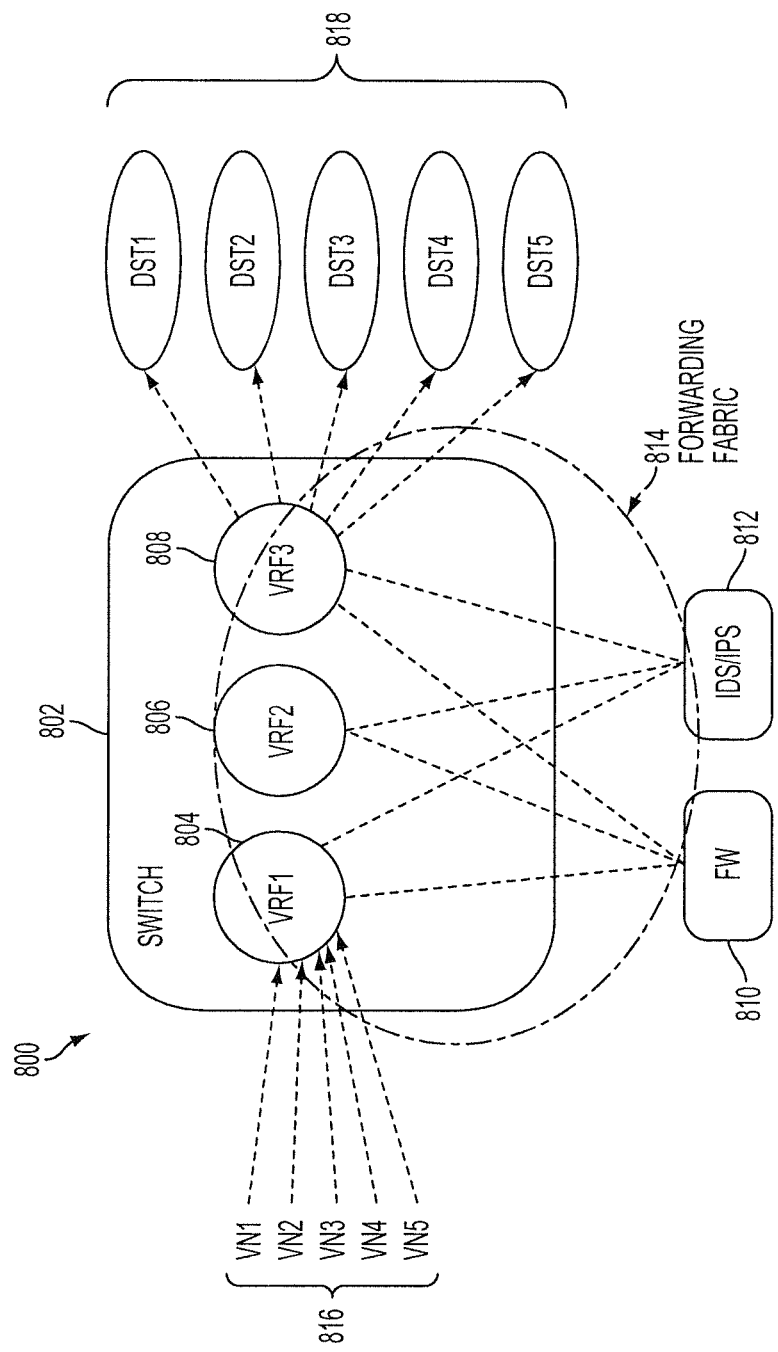
FIG. 8 illustrates an example physical view of a network node according to some embodiments.

FIG. 8 illustrates an example physical view of a network communication system 800 including a network node 802 according to some embodiments. The network node 802 may connect via a port to two service appliances 810, 812. The network node 802 may include three VRF instances, namely, VRF1 instance 804, VRF2 instance 806, and VRF3 instance 808 connected to the service appliances 810, 812 to form a service fabric 814. There may be five virtual networks providing input network data packets to source nodes 816 and receiving network data packets at destination nodes 818. As shown, the number of VRF instances required on the node 802 may be based on the number of service appliances connected to the node 802, not to the number of virtual networks coupled to the node 802 providing the input data packets. In this case, there are five virtual networks shown but only three VRF instances. This example further illustrates that source nodes 816 from all networks provide input into VRF1 804 which may be referred to as a common VRF instance for the incoming networks. The router receives the input data packets from the source nodes 816 at its ingress port and routes through a common VRF instance (e.g. VRF1 804) to implement the service fabric.

Figure 9:
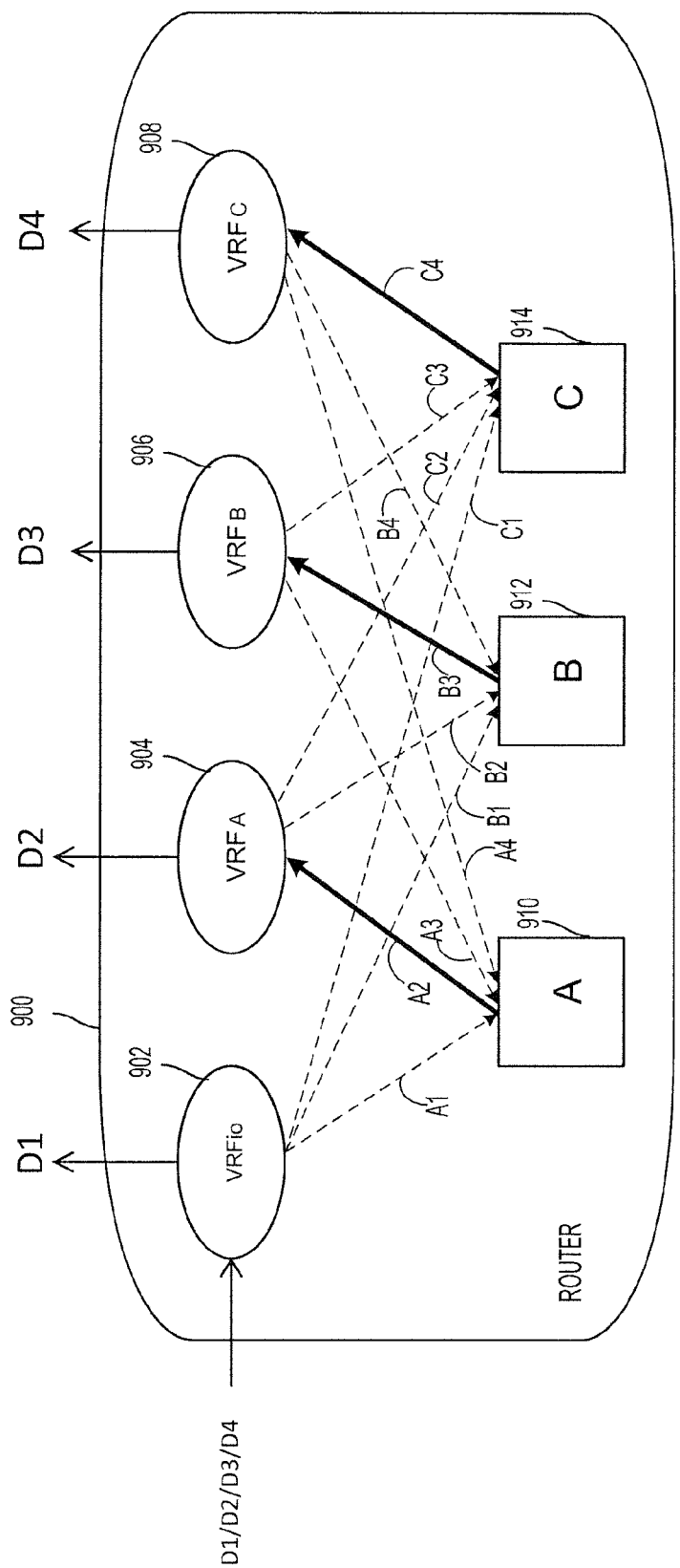
FIG. 9 illustrates another example schematic of a router according to embodiments described herein.

FIG. 9 illustrates another example router 900 configuring four VRF instances 902, 904, 906, 908. Router 900 connects to three service appliances 910, 912, 914 for the service chains. The number of VRF instances 902, 904, 906, 908 corresponds to the number of service appliances 910, 912, 914 used for the services chains, plus an additional VRF instance. As shown in FIG. 9, router 900 may connect incoming data packets with destination address D1/D2/D3/D4 to VRFio instance 902, which may serve the ingress port of the router 900. As shown in the example embodiments of FIG. 9, each VRF instance 902, 904, 906, 908 serves as an egress for a respective destination D1, D2, D3, D4.

Accordingly, for some example embodiments, any VRF instance can be an egress VRF instance and link to the egress port, instead of designating a VRF instance for the egress port. In such case, a VRF instance may be designated for the ingress port.

Service appliances 910, 912, 914 may have ingress interfaces for incoming network data packets and egress interfaces for outgoing network data packets. For this illustrative example, the links between VRF instances 902, 904, 906, 908 and service appliances 910, 912, 914 are one-directional, corresponding to the ingress and egress interfaces of the service appliances. The solid bold lines represent uplinks from the egress interfaces of the service appliances 910, 912, 914 to VRF instances 902, 904, 906, 908. The dashed lines represent downlinks from VRF instances 902, 904, 906, 908 to ingress interfaces of the service appliances 910, 912, 914.

For a service appliance, the egress interface may be determined based on which ingress interface the traffic comes in. Service appliances may not support routing in some example embodiments, and may be configured to achieve the service chaining required without routing capability. As an illustrative example, a firewall may have a configuration using Linux IPtables, but other configurations may be used.

Each service appliance 910, 912, 914 may have an egress interface to a different designated VRF instance as the next hop. The egress interface for each service appliance 910, 912, 914 may be preconfigured by a network controller for the DCN, for example.

Service appliance A 910 has interfaces A1, A2, A3, A4. An example configuration may be that service appliance A 910 has an egress interface A2 to VRFA instance 904 as the next hop for the data packet. That is, for service appliance A 910, interface A2 is the egress interface to VRFA instance 904. Service appliance A 910 has ingress interfaces A1, A3, A4. Service appliance A 910 may be configured so that all traffic coming in from interfaces A1, A3, A4 goes to interface A2.

Service appliance B 912 has interfaces B1, B2, B3, B4. Service appliance B 912 has an egress interface B3 to VRFB instance 906 as the next hop for the data packet. That is, for service appliance B 912, interface B3 is the egress interface to VRFB instance 906. Service appliance B 912 has ingress interfaces B1, B2, B4. Service appliance B 912 may be configured such that all traffic coming in from interfaces B1, B2, B4 goes to interface B3.

Service appliance C 914 has interfaces C1, C2, C3, C4. Service appliance C 914 has an egress interface C4 to VRFC instance 908 as the next hop for the data packet. For service appliance C 914, interface C4 is the egress interface to VRFC instance 908. Service appliance C 914 has ingress interfaces C1, C2, C3. Service appliance C 914 may be configured such that all traffic coming in from interfaces C1, C2, C3 goes to interface C4.

Accordingly, each service appliance may have a respective configured egress interface to a corresponding or designated VRF instance. The ingress port of the router may also have a corresponding or designated VRF instance. In this embodiment, each VRF instance can be said to correspond, or be designated, to either the ingress port or one service appliance, in the sense that the ingress port or service appliance can send only to that designated VRF instance, and the designated VRF instance can receive only from that ingress port or service appliance.

For any given service chain, an service appliance may only be used once in the service chain and also each service appliance may have an egress interface to a different VRF. Accordingly, no VRF instances may be on the forwarding path twice, so there is no loop created for any service chain, and, as a result, the forwarding is deterministic.

Various service chains can be provisioned using different combinations and ordering of the service appliances 910, 912, 914. The embodiments of devices, systems and methods described herein may be implemented in a combination of both hardware and software. These embodiments may be implemented using a router, network switches, service appliances, and other network devices. These embodiments may couple programmable computers, each computer including at least one processor, a data storage system (including volatile memory or non-volatile memory or other data storage elements or a combination thereof), and at least one communication interface.

The service appliances may process the input data to perform the services described herein and to generate output information. The output information may be applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Numerous references may be made regarding servers, services, interfaces, portals, platforms, appliances, and so on. The use of such terms may represent one or more hardware devices having at least one processor configured to execute software instructions stored on a computer readable tangible, non-transitory medium. For example, an appliance can include one or more computers operating as a web server, database server, or other type of computer server in a manner to fulfill described roles, responsibilities, or functions.

One should appreciate that the systems and methods described herein may provide improved network usage as data traffic may bypass service appliances by using VRF capabilities to implement different routing paths. All data traffic is not required to route through all service appliances of the service fabric.

Many example embodiments are discussed. Although each embodiment represents a single combination of elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using a combination of software and hardware. The technical solutions of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical hardware. The embodiments described herein provide useful physical machines and particularly configured networking hardware arrangements. The embodiments described herein are directed to electronic machines, physical devices, physical networks, and methods implemented by physical networks adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the computing devices, servers, receivers, transmitters, processors, memory, display, networks for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be by way of example only. The scope is indicated by the appended claims.

What is claimed is:

1. A router comprising:
an ingress port for receiving network data packets from a plurality of source nodes of a plurality of networks, each network data packet having a destination address;
an egress port for transmitting the network data packets to at least one destination node;
M+1 virtual routing and forwarding instances, VRFIs, for routing at least one of the network data packets to at least one of M service appliances, M being an integer greater than one; and
a persistent store for storing a plurality of routing tables, each routing table defining a plurality of routing rules for a VRFI of the M+1 VRFIs based on the destination addresses of the network data packets.

2. The router of claim 1, wherein the M+1 VRFIs comprise a VRFI for each service appliance of the M service appliances and an additional VRFI.

3. The router of claim 1, wherein the routing rules are not based on source addresses of the network data packets.

4. The router of claim 1, wherein the routing rules route a segment of the network data packets to bypass at least one service appliance of the M service appliances.

5. The router of claim 1, wherein the number of VRFIs of the M+1 VRFIs is not based on the number of networks of the plurality of networks.

6. The router of claim 1, wherein the network data packets received at the ingress port from the plurality of networks are routed by a common VRFI of the M+1 VRFIs.

7. The router of claim 1, wherein each VRFI is associated with a routing table of the plurality of routing tables.

8. The router of claim 1, wherein the number of VRFIs is based on the number of service appliances.

9. The router of claim 1, wherein the number of the plurality of networks is N, N being an integer greater than M+1.

10. The router of claim 1, wherein the M service appliances comprise at least one appliance selected from the group consisting of: firewall appliance, load balancing appliance, web service appliance, data service appliance, network address translator appliance, intrusion detection system appliance, and intrusion prevention system appliance.

11. A system comprising:
M service appliances, M being an integer greater than one;
a router comprising:
an ingress port for receiving network data packets from a plurality of source nodes of a plurality of networks, each network data packet having a destination address;
an egress port for transmitting the network data packets to at least one destination node;
a plurality of ports operable for connecting to the M service appliances;

M+1 virtual routing and forwarding instances, VRFIs, for routing at least one of the network data packets to at least one of the M service appliances, a common VRFI of the M+1 VRFIs routing the network data packets received at the ingress port from the plurality of networks; and a persistent store for non-transitorily storing a plurality of routing tables, each routing table defining a plurality of routing rules for a VRFI of the M+1 VRFIs based on the destination addresses of the network data packets.

12. The system of claim 11, wherein the M+1 VRFIs comprise a VRFI for each of the M service appliances and an additional VRFI.

13. The system of claim 11, wherein the routing rules are not based on source addresses of the network data packets.

14. The system of claim 11, wherein the routing rules route a segment of the network data packets to bypass at least one service appliance of the M service appliances.

15. The system of claim 11, wherein the number of VRFIs of the M+1 VRFIs is not based on the number of networks of the plurality of networks.

16. The system of claim 11, wherein each VRFI is associated with a routing table of the plurality of routing tables.

17. The system of claim 11, wherein the number of VRFIs is based on the number of service appliances.

18. The system of claim 11, wherein the plurality of networks provide N different networks, N being an integer greater than M+1.

19. The system of claim 11, wherein the M service appliances comprise at least one appliance selected from the group consisting of: firewall appliance, load balancing appliance, web service appliance, data service appliance, network address translator appliance, intrusion detection system appliance, and intrusion prevention system appliance.

20. A method for providing a plurality of service chains, comprising:

receiving network data packets from a plurality of networks at an ingress port of the router, each of the network data packets having a destination address;

configuring a router with M+1 virtual routing and forwarding instances, VRFIs, for routing at least one network data packet to at least one of M service appliances, M being an integer greater than one;

storing a plurality of routing tables in a persistent data store, each routing table defining a plurality of routing rules for a VRFI of the M+1 VRFIs based on destination addresses of the network data packets;

defining a plurality of service chains using the M+1 VRFIs;

routing, using at least one of the M+1 VRFIs, the at least one network data packet based on the at least one destination address of the at least one network data packet using at least one routing rule; and transmitting the at least one routed network data packet to a destination node at the egress port of the router.

21. The method of claim 20, further routing a segment of data packets to bypass at least one service appliance.

22. The method of claim 20, further comprising associating each VRFI with a routing table.

23. The method of claim 20, wherein the M+1 VRFIs comprise a VRFI for each service appliance of the M service appliances and an additional VRFI.

24. A method for routing network data packets comprising:

receiving network data packets at an ingress port of a router, each of the network data packets having a destination address;

routing, by at least one of M+1 virtual routing and forwarding instances, VRFIs, at least one network data packet to at least one of the M service appliances based on the at least one destination address of the at least one network data packet, M being an integer greater than one; and transmitting the routed at least one network data packet to a destination node at the egress port of the router.

25. The method of claim 24, wherein the step of receiving comprises receiving the at least one network data packet at the ingress port from at least one of N networks, N being an integer greater than M+1.

26. The method of claim 24, further comprising providing the at least one network data packet received at an ingress port to a common VRFI of the M+1 VRFIs.

* * * * *